United States Patent
Cully et al.

(10) Patent No.: US 11,907,589 B2
(45) Date of Patent: Feb. 20, 2024

(54) UNIFIED HOST MEMORY FOR COPROCESSORS

(71) Applicant: Bitfusion.io, Inc.

(72) Inventors: Aidan Cully, St. Augustine, FL (US); Mazhar Memon, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 818 days.

(21) Appl. No.: 16/504,362

(22) Filed: Jul. 8, 2019

(65) Prior Publication Data
US 2021/0011666 A1 Jan. 14, 2021

(51) Int. Cl.
G06F 3/06 (2006.01)
G06F 9/38 (2018.01)
G06F 9/50 (2006.01)
G06F 9/54 (2006.01)
G06F 12/02 (2006.01)

(52) U.S. Cl.
CPC ............ *G06F 3/0665* (2013.01); *G06F 3/064* (2013.01); *G06F 9/3877* (2013.01); *G06F 9/5016* (2013.01); *G06F 9/5022* (2013.01); *G06F 9/544* (2013.01); *G06F 12/023* (2013.01); *G06F 3/0607* (2013.01); *G06F 3/0679* (2013.01)

(58) Field of Classification Search
CPC ...... G06F 3/0665; G06F 3/064; G06F 9/3877; G06F 9/5016; G06F 9/5022; G06F 9/544; G06F 12/023; G06F 3/0607; G06F 3/0679
See application file for complete search history.

(56) References Cited

U.S. PATENT DOCUMENTS

| | | | |
|---|---|---|---|
| 2002/0013872 A1* | 1/2002 | Yamada | G06F 9/3881 710/240 |
| 2002/0087811 A1* | 7/2002 | Khare | G06F 12/0817 711/146 |
| 2005/0015637 A1* | 1/2005 | Van Eijndhoven | G06F 12/0862 713/400 |
| 2011/0040812 A1* | 2/2011 | Phillips | G06F 9/45541 707/822 |
| 2012/0233610 A1* | 9/2012 | Mandre | G06F 9/455 718/1 |
| 2015/0269205 A1* | 9/2015 | Ma | G06F 16/2237 707/614 |
| 2019/0028335 A1* | 1/2019 | Shrivastava | G06F 9/4416 |
| 2019/0114254 A1* | 4/2019 | Memon | G06F 21/78 |

* cited by examiner

*Primary Examiner* — Emerson C Puente
*Assistant Examiner* — Jonathan R Labud
(74) *Attorney, Agent, or Firm* — Kim & Stewart LLP

(57) ABSTRACT

At least one application of a client executes via system software on a hardware computing system that includes at least one CPU and at least one coprocessor. A virtualization layer establishes unified memory address space between the client and the hardware computing system, which also includes memory associated with the at least one coprocessor. The virtualization layer then synchronizes memory associated with the client and memory associated the at least one coprocessor. The virtualization layer may be installed and run in a non-privileged, user space, without modification of the application or of the system software running on the hardware computing system.

10 Claims, 3 Drawing Sheets

UNIFIED HOST MEMORY FOR COPROCESSORS

TECHNICAL FIELD

This invention relates to computing systems that include coprocessors.

BACKGROUND

As both the extent and complexity of computer processing have grown even in everyday modern life, there is a well-known, ever-increasing need for greater processing power. In many cases, even the increases in processing capability predicted by Moore's Law is insufficient.

One way to increase processing capacity is to distribute the load. "Cloud computing" is one known distribution scheme, in which local systems access shared processing resources such as servers remotely via a network, usually on demand. Although making essentially unlimited resources available, network delays alone preclude use of such an arrangement for many computationally intensive, time-critical or synchronized tasks.

One approach to handling some such tasks is "parallel computing", in which a task is decomposed into discrete sub-tasks that can be performed simultaneously by different processing systems. Certain processing tasks involve operations that can be performed by a system's main processor, but that are so specialized that an auxiliary processor—a coprocessor—may instead be more efficient, thereby leaving the more general operations to the main processor. Coprocessors are thus frequently included in systems to perform such operations as floating point arithmetic, encryption, string processing, I/O interfacing, and signal and graphics processing. Such coprocessors may be locally and/or remotely attached.

The specialization of coprocessors offers many obvious advantages—they are, after all, designed to perform certain tasks especially well—but they also create challenges, especially when a main hardware platform is to be able to access more than one coprocessor, which may have different API protocols, may be distributed, that is, with some or all of them remote, may have unbalanced loading, etc.

Coprocessor hardware and software are moving more and more in the direction of giving the coprocessor transparent access to CPU memory. One way to enable this is to do separate allocations on the client and the server, but this often requires expensive and imperfect pointer rewrites, and also requires an inference as to when memory should be synchronized between client and server.

What is needed is therefore a system and operational method that more efficiently coordinates memory between the different components of a system that includes coprocessors.

DETAILED DESCRIPTION

In broad terms, embodiments of this invention take a different approach to address this shortcoming, and implement a strategy of providing, in some embodiments, a common address range for clients and servers. This address range may then be used for CPU/coprocessor-transparent allocations on all involved nodes, as well as a more robust strategy for synchronizing memories between the client and servers.

As used in this disclosure, a "node" may be one or more client or server machines; thus, for simplicity, "node" may refer to a plurality of entities. A "client" is a node that runs an application, while the "server" is the entity that includes the coprocessors and services client requests. In a more general configuration, two clients could establish a shared memory area between themselves and so could two "servers"—additionality a single shared memory buffer could be established between a group of clients and servers. A multi-process application might even run on multiple physical nodes, and embodiments of this invention may be used to synchronize virtual memory processes on different systems.

Figure 1:
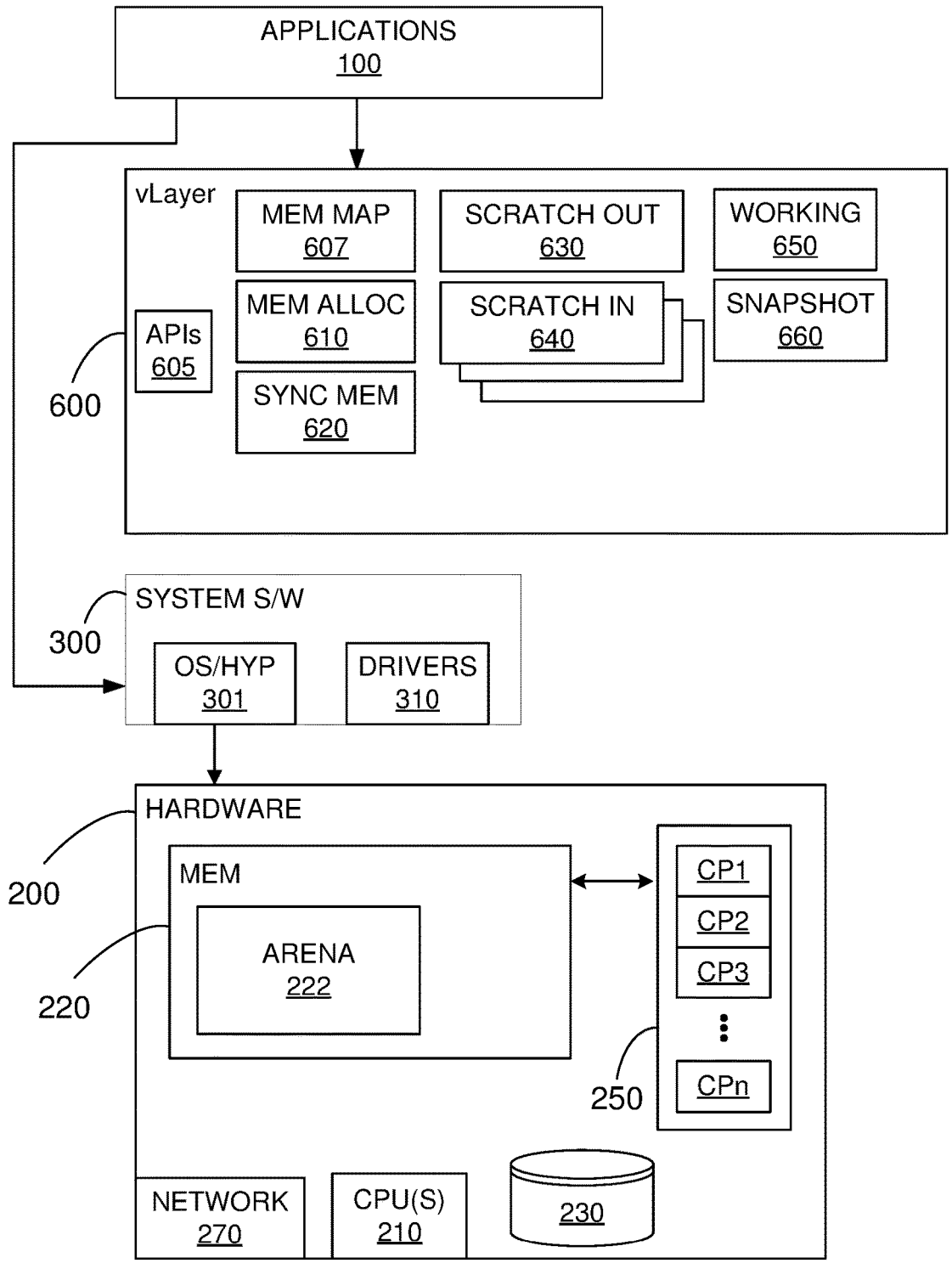
FIG. 1 illustrates the main hardware and software components of a system that implements a unified address range on a client and servers, which can be used for CPU/coprocessor-transparent memory allocations.

FIG. 1 illustrates one example of a hardware/software stack in which applications 100 run on a host hardware platform 200, typically under the control of a system software layer 300 such as an operating system (OS). In addition to other standard components, the hardware platform will include one or more processors 210, volatile storage 220 (such as RAM) and usually non-volatile storage components 230 (such as SSD, disk, etc.), as well as components for communicating with other systems over a network and other peripherals as needed, for example, network interface components 270. As is well understood, both user-level applications and system-level software processes are generally embodied as computer-executable code that is stored in either storage 230, memory 220, in a device's dedicated storage/memory, etc., and that is then loaded into the appropriate to the processor(s) or coprocessors for execution.

Depending on the configuration, the hardware platform 200 may also include one or more coprocessors 250 (CP1, . . . , CPn), such as graphics processing units GPUs; these may, however, also be located within other systems, accessible via any standard buses or networks, such that the concept of "hardware platform" may be broadened to include such "peripheral" or even remote coprocessors, such as coprocessors in cloud computing environments. Embodiments may also be used in other forms of distributed systems, such as a software-defined infrastructure (SDI). Although not shown, coprocessors may also have dedicated components of their own, such as memory. The applications 100 may also be running in a distributed processing environment, with more than one server handling processing tasks.

Coprocessors typically have a "master-slave" relationship relative to the normal host CPU(s) 210 that runs the applications—an application is typically run on the host CPU(s) while certain computational tasks are offloaded to coprocessors for increased performance. Compute APIs, that is, APIs that are used by applications to leverage coprocessors, have explicit functions to offload computation and move data between host memory and coprocessor device memory.

The API for each coprocessor, accessible by the overall system, is known and exposed to the applications that may wish to use them. Some of these APIs will be open, that is, public, whereas others may be customized for certain coprocessors. Even in the case of customized APIs, however, these will be known to all applications that may need to use the corresponding coprocessor. Since the coprocessors available at any given time are known to the system, their APIs are also known. As is known, applications 100 are programmed to properly format API calls to the coprocessors they wish to use and in many cases, the APIs that each application will call into may also be known in advance.

An intermediate, virtualization layer (vLayer) 600 is provided that may run in user space, that is, not necessarily in system software such as an OS or hypervisor, or in an application 100. Thanks to this, the invention can be portable, installed to run in a wide range of environments, without requiring modification of system software or clients running applications on the servers, or of the applications themselves. Moreover, because the vLayer may run in a non-privileged execution mode, security and data confidentiality may be enforced without compromising the system with additional privileged code. Furthermore, unlike other approaches, additional features can be introduced into the vLayer without having to change the underlying operating system, drivers, or virtual machine hypervisors.

System software 300, including a host operating system 301, is generally included to perform well-known functions, and will typically include drivers 310 that control communication with respective devices. The software—including the applications, the system software itself, and the virtualization layer 600—that runs on the hardware platform 200 is generally processor-executable code that is embodied as instructions stored in the storage and memory components, or on some other computer-readable medium, although some instructions especially for specialized devices may also be permanently stored in the devices themselves.

In many modern computing environments, the application layer 100 includes, and sometimes is even totally comprised of, one or more virtual machines (not shown), in which case the system software 200 may include a system-level virtualization component such as a hypervisor, which acts as the virtual-to-physical interface. In some systems, the hypervisor is co-resident with the host OS, with both operating in a privileged mode; in other systems, the host OS intermediates some or all hypervisor commands to the hardware; in still other systems the hypervisor replaces the host OS altogether; and in systems without virtualized components such as VMs, no hypervisor may be needed and included at all. Embodiments of this invention do not require VMs, although they may operate with VMs as with any other applications that call coprocessors; moreover, system programmers will be able to adapt embodiments to different host OS/hypervisor configurations, including those with no separate host OS at all.

Applications generally include various core functions, such as the routines needed to communicate processing requests to the operating system, to access the file system, allocate memory, and access common functional libraries for operations such as data compression, image manipulation, accelerated math functions, etc. Compute APIs, specifically, deal with the management of coprocessors, execution flow, and data movement, to make full and efficient use of the coprocessors. This includes dispatching data and compiled compute routines, returning status information, and synchronizing streams of execution between the coprocessors and other coprocessors, and the coprocessors and the host system. As is well known, an API comprises routines and protocols that specify how software components should interact, how a software component such as an application may interact with a hardware component, etc.

OpenCL (Open Computing Language) is a well-known and widely used language for cross-platform, parallel programming of diverse processors. OpenCL is often used, for example, in APIs. Various features, in particular, function calls, of embodiments of the invention are described below in OpenCL terms. This is just one design choice, however, and skilled programmers will know how to use any other parallel language or paradigm to implement any software components or features described below in an OpenCl context. Examples of such alternatives include CUDA, SQL, MPI, OpenMP, and OpenACC.

System software and certain other components generally run at a "privileged" level, meaning that they are allowed to issue, and have executed, instructions that affect such things as storage protection settings, interrupt handling, scheduling, I/O coordination, special processor status and register settings, etc. Applications, on the other hand, typically operate in a non-privileged user space, that is, in user mode.

Embodiments of this invention provide a layer—the aforementioned virtualization layer (vLayer)—labelled 600 in FIG. 1, that may run at the non-privileged, user level and that intercepts and handles some application calls to system-level resources, in particular, coprocessors; other calls may be allowed to pass directly to the system software for handling as usual. The vLayer 600 may be provided in addition to other existing intermediate software layers; alternatively, the vLayer components described here may be included in an existing intermediate layer. The vLayer 600 may include known software components such as application programming interfaces (APIs) 605, as well as other components that are described below. Although these components are shown as being in "the" virtualization layer 600, one or more of them could also be included in some other software layer, including dedicated layers. In other words, the concept of a "layer" may encompass more than one separately created software component that cooperates with others to perform the functions described herein for the vLayer.

The vLayer 600 is preferably configured so as not to require any changes to the applications running above, or modifications to the system software on which the layer itself runs. In other words, embodiments may run on commodity systems. Although this configuration leads to advantages such as ease of installation and use, portability, universality, and convenience, other configurations are possible. For example, the vLayer could be installed at the privileged level, and could even be incorporated into system software, in the OS or a hypervisor.

The code that comprises the vLayer may be installed in the system and configured using any known method, including downloading it from a network, reading in the code from a tangible, non-volatile storage medium, etc. This is in fact one advantage of the invention: It may be installed like other user-level applications, including applications that interact with other applications, with no need to modify the system software or include dedicated or modified hardware.

As shown in FIG. 1, the vLayer 600 includes several components, whose functions are described below. Some of these components are comprised of executable code while others are portions of memory. They will therefore be embodied within the memory 220 of the hardware platform, but are illustrated as being within the layer 600 because they are associated with the functionality of the vLayer.

Embodiments may implement either a relatively quick (but sub-optimal) strategy, or a "correct" (and performant)

strategy. The main method steps the embodiments carry out are: 1) Obtaining a true unified address space between the client and the servers, for CPU/coprocessor synchronized memories; and 2) defining a robust strategy for managing memory synchronization.

To enable unified addresses, the "quick" embodiment uses a memory map MEM MAP 607 with a destination address specification on the client and all servers, until a common address can be agreed upon. One way to achieve this is for the memory mapping mechanism to attempt to map a certain address range and, if it is not immediately successful, it may repeatedly select another range until it is. For memory synchronization, a polling thread is then defined that continuously looks for memory changes on the client and on the server. One of many examples of a suitable memory mapping mechanism is mmap, which operates in a manner similar to memory allocation (malloc), but allows for control over what the backing memory actually is. mmap( ) (an argument of which may specify a desired address range to map) can, for example, return a pointer to the application, and the backing of the memory could be from a heap, a file, or pinned physical memory.

Figure 2:
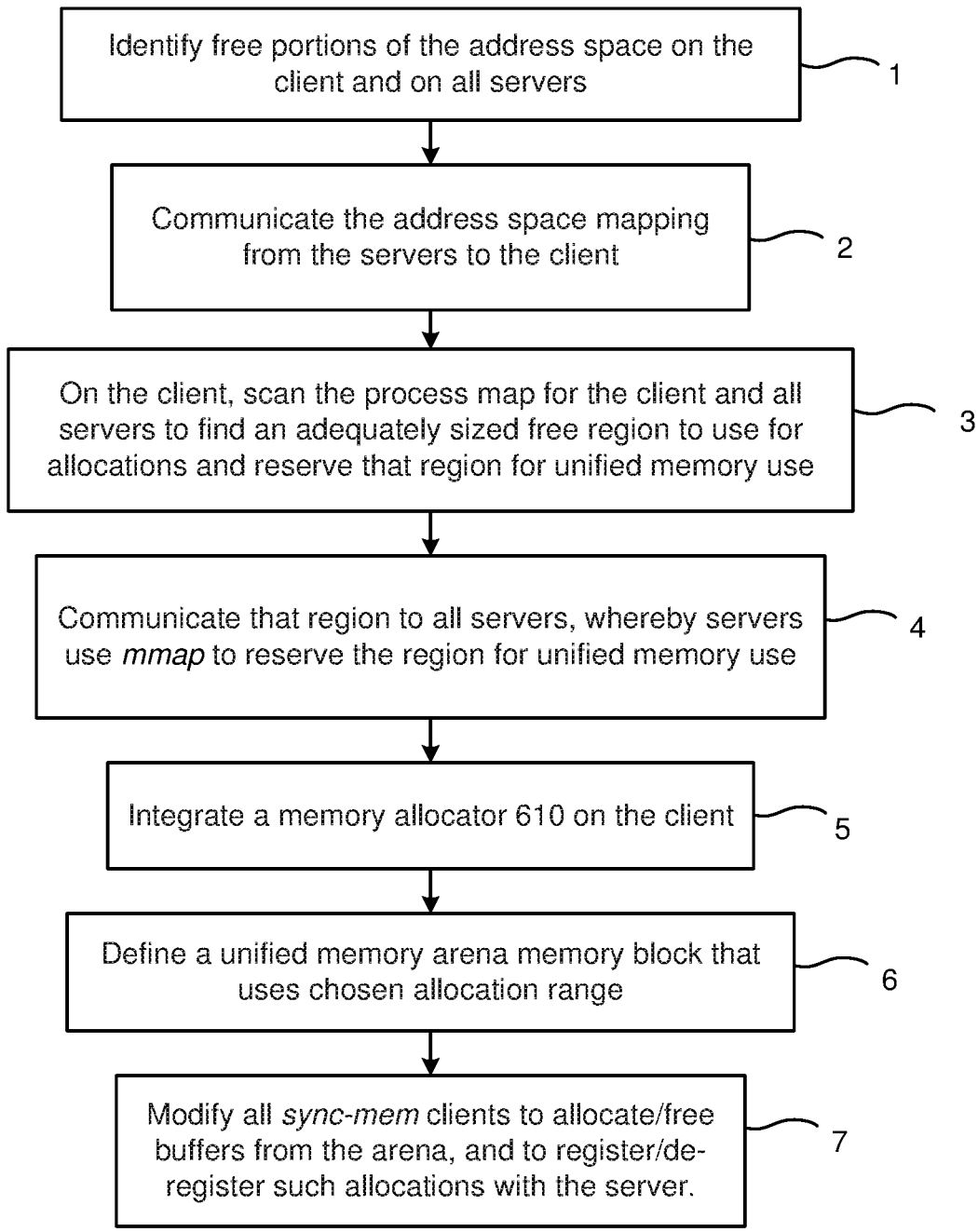
FIG. 2 is a flowchart that shows the main steps for implementing a unified address space.

One implementation strategy according to a "correct" embodiment implements a true unified address space by performing the following tasks (also shown in FIG. 2):

1) Identify free portions of the address space on the client and on all servers. This may be done by reading the various memory maps.

2) Communicate the address space mapping from the servers to the client.

3) On the client, scan the process map (standard in most existing computer systems) for the client and all servers to find an adequately sized free region to use for allocations and reserve that region for unified memory use. In a Linux/Unix context, this may be accomplished with an mmap (with an address hint) call, but any known mechanism may be used to specify the desired address range to map. Generally, this is a mapping of the address space of something (e.g. device, file) into the virtual address space of the process. This has the useful property of reserving regions in memory and therefore allowing the addresses between the client and server to be identical for specific uses.

4) Communicate that region to all servers; the servers will then use mmap to reserve the region for unified memory use. Note that, in some situations, it may be necessary to repeat steps 3 and 4. For example, a retry on reservation may be necessary if any address in that range is already in use so as to achieve continuous (unused) address ranges on both the client and server and thereby ensure that the system can unambiguously relate accesses on the client and server to the same memory and type.

Consider steps 3 and 4. As is known, a process map is a mapping (per process) that shows what areas of an application's address space is used and by what. By scanning this mapping, the virtualization layer can identify "free" areas that are equal to, or larger than the size needed to map. It may then compare this process map on the client and server and take the intersection (for example), which enables it to more directly find candidate mappings that can be memory-mapped.

5) The intermediate, virtualization layer 600 runs within the context of the application's process and may use an internal memory allocator 610 to allocate within the unified memory ranges. One example of a suitable, known memory allocator is jemalloc, which emphasizes fragmentation avoidance and provides scalable concurrency support. Other memory allocators may be used instead, depending on design preferences. Steps 3 and 4 above thus map a large range that can be synchronized between the client and server. This step S then allows for the application (by way of API calls that allocate memory) to allocate smaller blocks of memory within this range. For example, 10 GB of memory could be mapped, but applications will most often allocate smaller chunks at a time (1 MB, 2 MB, 10 KB, etc.).

6) Use any known allocator (as just one of many examples, jemalloc) to define a unified memory arena memory block ("arena") 222 that uses this allocation range. Here, as is known, an "arena" (sometimes referred to alternatively as a region, zone, area or "memory context") is a typically relatively large, contiguous memory space that can be allocated and deallocated as a unit. Portions of the arena 222 may, however, be managed, in particular, allocated, separately. This allows for full control over memory allocation works, except for a single library call for the initial allocation.

7) As is known, sync-mem is code (a class/set of functions) that is responsible for synchronizing individual allocations within a mapped range. Modify all sync-mem clients to allocate/free buffers from the arena, and to register/deregister such allocations with the server.

Figure 3A:
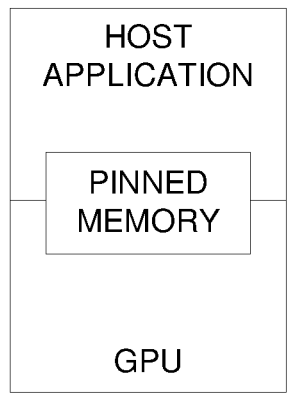
FIGS. 3A and 3B illustrate, respectively, a simple example of the difference between how pinned memory is accessed by a host application and a coprocessor in a native, known system, and in a system that incorporates the invention.
Figure 3B:
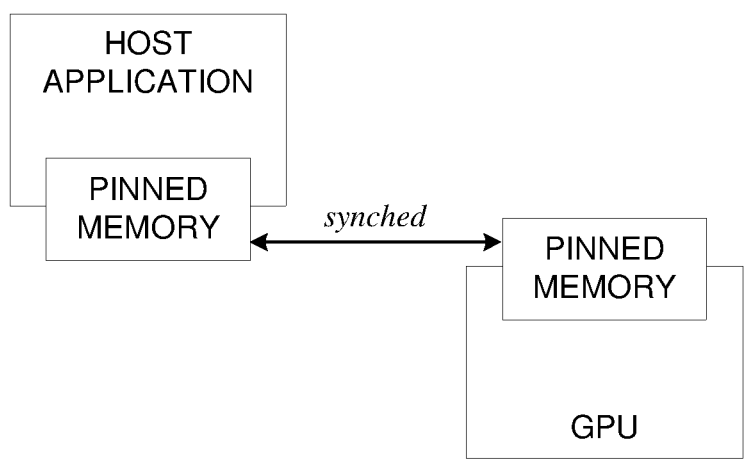

Embodiments include a memory synchronization mechanism, which may be defined as a memory coordinator class (referred to here as "sync_mem") that associates client and server memory to be synchronized. This sync_mem class has defined address ranges and the status of the memory, either in part, such as per page within a buffer, and/or as a whole. The sync_mem coordinator class may include various memory structures, such as:

working memory 650, which exposes the unified memory addressing scheme to clients snapshot memory 660; Note that the snapshot and working memory structures may be implemented as portions of a single buffer sized to be big enough to implement both. Both client and server sides preferably have two copies of the buffer within a sync_mem. The first copy is the "live" copy used for it's own operation and the "snapshot" copy is what it believes to be on the other side, that is, on the server side, as viewed by the client, or on the client side, as viewed by the server. By comparing the difference between the live and snapshot copies after a certain operation, the client or server may send only the differences instead of the entire buffer. This has the effect of substantially reducing the amount of data needed to be transferred for clients, an optional working memory alias See FIGS. 3A and 3B. FIG. 3A illustrates, in greatly simplified form, the typical native, prior art arrangement: In order for an application and a coprocessor (such as a GPU) to share memory, it is pinned to both, since it is the identical memory space. As FIG. 3B illustrates, however, according to embodiments of this invention, the application may "think" the memory it and the coprocessor are accessing are the same, accessible locally, but in fact they need not be; rather, the application addresses "its" pinned memory, whereas the target coprocessor is using a different memory space, which is synchronized with the pinned memory that the application is addressing. The client/application may remain unaware (and thus require no code modification) of this "split", synchronous arrangement.

The unified memory arena memory block 222 should have each of these two or three virtual memory area (VMA) allocations attached. In addition to these memory structures, separate scratch buffers 630, 640 may also be included to handle updates. In one embodiment, updates may be calculated by polling, whereby a background thread may scan through every live extent from the arena and compare the most recent snapshot with the current working memory. On receipt, applying the delta may be used to update both the snapshot and the working copy of the memory. The known term "live extent" refers to an outstanding memory synchronization request. There will generally be areas of memory that have been changed, and a background thread may continuously scan for them and set changes aside. This can be done in the background, on demand, or both. If changes are detected, the virtualization layer may take the differences ("delta") between the most recent snapshot and the current memory state to an outbound scratch memory buffer 630 and update the snapshot before sending the delta (for example, using a remote direct memory access—RDMA—operation, if available) to all entities that synchronize this buffer.

At least one scratch memory buffer 630 may be used for outbound updates, whereas N inbound scratch memory buffers 640 are preferably provided for inbound updates, where N is the number of servers. If so implemented, RDMA writes may be ensured always to go from the outbound scratch buffer to the inbound scratch buffer associated with the current server (or client), so that different communications pairs will not write the same memory, even if multiple servers are communicating at a time.

In the described embodiments, a class associated with sync_mem coordinator 620 thus preferably includes an outbound scratch buffer 630 and N inbound scratch buffers 640, RDMA-registered (if possible). The sync_mem class thereby provides an interface for registering and unregistering sync_mem instances for polling. It will poll registered sync_mem's for changes, and when it discovers any, forward the change set to all other network participants. It may also implement a function for applying received deltas to the working memory set and snapshot.

The mechanisms described above efficiently handle live updates, but there should also be a mechanism to establish initial communication. In one embodiment, this is provided by implement an epoch-based barrier. For example, taking the CUDA context as just one example, on every cuLaunch-Kernel (that is, execution of code on the coprocessor) the client may check a generation number for the sync_mem coordinator 620 and delay the kernel launch until this generation number increments by 2 (one caused by the client and one by the server, indicating that both have gone through the buffer), where every sweep through the registered sync_mem modules will bump the generation number by 1. For example, if client starts with a buffer with version 0, and the server subsequently changes the buffer, thereby advancing its version to 1, the client will know the server has the later version simply by comparing the version or "generation" numbers. The use of mprotect-based optimizations, described below, may be used to limit the set of memories that need to be polled.) Note that this is only one example of a suitable mechanism for tracking "versions" or "generations" of data to know when the data has been updated enough for a dependent operation to continue. Another example of a way to maintain data coherency is the known MESI protocol used for cache coherency, transactional memory, many distributed systems approaches, distributed databases, etc. Other known mechanisms may be used as well.

With respect to true memory synchronization, in which both the client and server may read and modify their ranges (although not the same bytes) at the same time, assume the following:

1. any coprocessor can read/modify/write any pinned memory at any time
2. a /coprocessor cannot be stalled
3. any known mechanism for detecting client and server memory accesses (reads or writes). Several such mechanisms are known, including, but not limited to:
   i. User-mode page faulting (e.g. use/ii.
   ii. Specialization of an operating system page fault handler
   iii. Virtual Machine Manager that traps on accesses to target memory
   iv. System calls such as mprotect
   v. Separate thread or process that compares target memory against a snapshot An embodiment of the invention synchronizes memory in multiple contexts by adapting cache coherency protocols currently provided for CPUs. Because of the assumption in this example that all participants are "well behaved", the system may use a cache coherency protocol in which deltas are sent to all participants when changes are detected. For servers that cannot use page faults, polling for changes may be employed to observe memory use. If a server detects a memory change for a synchronized page, it schedules a broadcast to all participants including the delta from the last time that memory was synchronized. The receiver may then apply that delta and update its memory snapshot.

Any known mechanism (as one of many examples, the known function mprotect( )) may be included in the virtualization layer to change access protections for a calling process's memory pages that contain any part of a specified address range and to detect access to shared memory: After the arena is defined, this mechanism may be called with the address range the common address space such that any user access will cause a SEGV signal, that is, a known error signal caused by an invalid memory reference or a segmentation fault (if memory is segmented). The system may then handle the SEGV signal to identify which page the user attempted to access. The region may then be specified in a new call to allow access to the page and start a timer that, when it expires, may be used to disable access again. When the timer expires, the system may check for any user changes to the memory, and broadcast updates to all servers, describing any changes. As an optimization, some embodiments may be able to make this process faster by checking allocation flags.

Many different specific structures and routines are described above, but they lead to a "big picture", with several advantages. In particular, two or more devices may communicate via an "illusion" of a shared memory buffer. This simplifies the programming model for clients, since the client CPU and a desired coprocessor can access the same memory without explicit API support: Instead of requiring an explicit host-to-device transfer (declaring a buffer and initiating a copy procedure), pointers to the shared memory structure may simply be provided: every coprocessor receives a host pointer, and the host gets a GPU pointer, while a driver in the virtualization layer copies data back and forth depending on what's demanded by the host or device.

This addressing scheme maintains a unified address space, with an I/O map, a range for CPU access, an interface for coprocessors, and a memory map that ensures that devices have access to different ranges. Each coprocessor will "own" (be uniquely assigned) a portion of the unified memory space, but whenever this coprocessor causes an access fault, the memory becomes visible to host and may be given to user application.

One significant advantage of the method according to embodiments is that it relieves programmers of the current burden of explicitly moving data between coprocessors and the CPU. The CPU on each client is writing to a buffer associated with that client, but the coprocessor has its own buffer in the server. The buffers are then synchronized so that they have identical copies, for example, at certain time boundaries.

Another advantage of the embodiments described above is that the system may be implemented without requiring additional physical servers, without a requirement for high-performance networking.

The embodiments of the invention described primarily above relate to establishing a common address range between a client and a coprocessor. Thus, address X in the client application corresponds to address X in the server application. Using suitable mappings, however, other embodiments may support cases where the address range of the client application is different than the address range of the server process, which may enable more address mappings to be made available.

What is claimed is:

1. A data processing method comprising:
   executing instructions of at least one application of a client via system software on a hardware computing system that includes at least one CPU and at least one coprocessor, said at least one application including instructions to be executed on the at least one coprocessor; and
   using a virtualization layer that is logically between the at least one application and the system software in a non-privileged, user space and runs on the hardware computing system,
      establishing a unified memory address space between the client and the hardware computing system for memory associated with the client and memory associated with the at least one coprocessor, and
      synchronizing a first memory and a second memory that is different from the first memory, wherein the first memory is associated with the client and the second memory is associated with the at least one coprocessor, and the first memory and the second memory reside in the unified memory address space, wherein
   the virtualization layer is installed without modification of the at least one application or of the system software running on the hardware computing system, and
   the steps of establishing the unified memory address space and synchronizing the first memory and the second memory are transparent to the at least one application.

2. The method of claim 1, further comprising:
   creating a memory map with a destination address specification on the client and the hardware computing system;
   determining agreement between the client acid the hardware computing system with respect to a common memory address range; and
   detecting memory changes on the client and hardware computing platform.

3. The method of claim 1, further comprising:
   via the virtualization layer:
      identifying free portions of an address space on the client and on the hardware computing system;
      communicating an address space mapping from the hardware computing system to the client;
      scanning a process map for the client and the hardware computing system to find a free memory region available for allocation and reserving said free memory region for unified memory use; and
      communicating said free memory region to the hardware computing system and reserving the free memory region for unified memory use;
   integrating a memory allocator on the client and, via the memory allocator, defining a unified memory arena using the free memory region; and
   via the virtualization layer, allocating and freeing buffers from the unified memory arena, and registering/deregistering said allocations with the hardware computing system.

4. The method of claim 3, further comprising identifying the free portions by reading at least one memory map.

5. A data processing system comprising:
   at least one central processing unit (CPU);
   at least one coprocessor;
   at least one application of a client running via system software on a hardware computing system that includes the at least one CPU and the at least one coprocessor;
   a virtualization layer installed to run on the hardware computing system and comprising computer-executable code which, when executed on the at least one CPU, is provided:
      for establishing a unified memory address space between the client and the hardware computing system for memory associated with the client and memory associated with the at least one coprocessor; and
      for synchronizing the memory associated with the client and the memory associated with the at least one coprocessor,
   wherein the virtualization layer runs logically between the at least one application and the system software in a non-privileged, user space, without modification of the at least one application or of the system software running on the hardware computing system, whereby the virtualization layer establishes the unified memory address space and synchronizes the memory transparently to the at least one application.

6. The system of claim 5, further comprising:
   a memory map with a destination address specification on the client and hardware computing system,
   wherein the virtualization layer is further provided:
      for determining agreement between the client and the hardware computing system with respect to common memory address range; and
      for detecting memory changes on the client and hardware computing platform.

7. The system of claim 5, further comprising
   a memory allocator on the client; and
   buffers,
   wherein the virtualization layer is further provided:
      for identifying free portions of an address space on the client and on the hardware computing system;
      for communicating an address space mapping from the hardware computing system to the client;
      for scanning a process map for the client and the hardware computing system to find a free memory region available for allocation and reserving said memory region for unified memory use; and
      for communicating said free memory region to the hardware computing system and reserving the region for unified memory use,
   said memory allocator being provided for defining a unified memory arena using the free memory region, and said virtualization layer being further provided for allocating and freeing buffers from the unified memory arena, and registering/deregistering said allocations with the hardware computing system.

8. The system of claim 7, further comprising at least one memory map identifying the free portions.

9. A data processing method comprising:
executing instructions of at least one application of a client via system software on a hardware computing system that includes at least one CPU and at least one coprocessor, said at least one application including instructions to be executed on the at least one coprocessor; and
using a virtualization layer that runs on the hardware computing system,
creating a memory map with a destination address specification on the client and the hardware computing system,
determining agreement between the client and the hardware computing system with respect to a common memory address range,
detecting changes to a first memory that is associated with the client and is mapped to the common address range, and a second memory different from the first memory, that is associated with the at least one coprocessor and is mapped to the common address range, and
synchronizing the first memory and the second memory.

10. The method of claim 9, further comprising installing the virtualization layer logically between the at least one application and the system software in a non-privileged, user space, without modification of the at least one application or of the system software running on the hardware computing system.

* * * * *